US009759574B2

United States Patent
Makled et al.

(10) Patent No.: US 9,759,574 B2
(45) Date of Patent: Sep. 12, 2017

(54) VEHICLE EMERGENCY BROADCAST AND RELAY

(71) Applicant: Ford Global Technologies, LLC, Dearborn, MI (US)

(72) Inventors: Daniel A. Makled, Dearborn, MI (US); Gopichandra Surnilla, West Bloomfield, MI (US); Michael Mcquillen, Warren, MI (US)

(73) Assignee: Ford Global Technologes, LLC, Dearborn, MI (US)

( * ) Notice: Subject to any disclaimer, the term of this patent is extended or adjusted under 35 U.S.C. 154(b) by 107 days.

(21) Appl. No.: 14/799,017

(22) Filed: Jul. 14, 2015

(65) Prior Publication Data
US 2017/0018182 A1 Jan. 19, 2017

(51) Int. Cl.
G08G 1/123 (2006.01)
B60Q 1/50 (2006.01)
(Continued)

(52) U.S. Cl.
CPC ............ G01C 21/36 (2013.01); G08B 21/02 (2013.01); G08B 25/00 (2013.01); G08G 1/087 (2013.01);
(Continued)

(58) Field of Classification Search
CPC ....... G08G 1/161; G08G 1/162; H04W 84/18; H04W 76/007; H04W 76/00; H04W 4/22; H04W 72/005; G08B 25/016; G01C 21/36
(Continued)

(56) References Cited

U.S. PATENT DOCUMENTS 6,642,844 B2 * 11/2003 Montague ............ B60R 25/102
340/286.02
7,432,804 B2 * 10/2008 Suzuki ................... H04W 4/22
340/539.1

(Continued)

FOREIGN PATENT DOCUMENTS

KR 101407705 B1 6/2014

OTHER PUBLICATIONS

Johnson, Lyndon, Honda Showcases Autonomous Lane-change, "Virtual Tow" Tech., http://www.technologytell.com/in-car-tech/10128/honda-showcases-autonomous-lane-change-virtual-tow-tech/, Sep. 12, 2014, pp. 1-13.
Automatic Signal Control to Prevent Emergency Vehicle Collisions, ITS International, http://www.itsinternational.com/sections/nafta/features/automatic-signal-control-to-prevent-emergency-vehicle-collisions/, Jan./Feb. 2012, pp. 1-5.

*Primary Examiner* — Hoi Lau
(74) *Attorney, Agent, or Firm* — Frank A. MacKenzie; Brooks Kushman P.C.

(57) ABSTRACT

A vehicle includes a communication system. The communication system includes at least one controller and may include an RF transceiver. The controller is configured to receive a distress signal including emergency information and a relay count. The controller is configured to respond, when the relay count is less than a predetermined number and a location of the vehicle is greater than a predetermined distance away from a transmission location and an origination location of the distress signal, by causing the emergency information to be transmitted with an incremented relay count. The controller may be further configured to respond to the location of the vehicle being between the origination location and at least one transmission location by inhibiting the transmitting of the emergency information.

12 Claims, 4 Drawing Sheets

(51) Int. Cl.
*G01C 21/36* (2006.01)
*G08B 21/02* (2006.01)
*G08B 25/00* (2006.01)
*G08G 1/087* (2006.01)
*G08G 1/09* (2006.01)
*G08G 1/0965* (2006.01)
*G08G 1/0967* (2006.01)
*H04W 76/00* (2009.01)
*H04W 84/18* (2009.01)

(52) U.S. Cl.
CPC ........... *G08G 1/093* (2013.01); *G08G 1/0965* (2013.01); *G08G 1/096716* (2013.01); *G08G 1/096741* (2013.01); *G08G 1/096791* (2013.01); *H04W 76/007* (2013.01); *H04W 84/18* (2013.01)

(58) Field of Classification Search
USPC ........ 340/286.02, 539.1, 471, 901, 7.5, 989, 340/7.51; 370/312, 347, 328; 709/204, 709/226
See application file for complete search history.

(56) References Cited

U.S. PATENT DOCUMENTS

| | | | |
|---|---|---|---|
| 7,991,551 B2* | 8/2011 | Samuel | G08G 1/162 340/901 |
| 2007/0046457 A1* | 3/2007 | Suzuki | H04W 76/007 340/539.1 |
| 2007/0096892 A1* | 5/2007 | Nathan | G08G 1/161 340/471 |
| 2010/0202346 A1* | 8/2010 | Sitzes | H04W 84/18 370/328 |
| 2013/0086164 A1* | 4/2013 | Wheeler | C08L 61/06 709/204 |
| 2013/0279392 A1* | 10/2013 | Rubin | H04W 72/005 370/312 |
| 2013/0279393 A1* | 10/2013 | Rubin | H04J 3/1694 370/312 |
| 2013/0279491 A1* | 10/2013 | Rubin | G08G 1/166 370/347 |

* cited by examiner

VEHICLE EMERGENCY BROADCAST AND RELAY

TECHNICAL FIELD

This application is generally related to vehicle systems configured to selectively broadcast and relay emergency information.

BACKGROUND

Drivers of vehicles have a constantly growing amount of information to observe and process in order to maneuver safely while driving on the open road. Drivers must not only know about and adhere to the rules of the road in their own right, but they must also be aware of what nearby vehicles are doing. Vehicle to vehicle (V2V) and vehicle to infrastructure (V2I) systems allow vehicles to communicate and share information allowing the drivers to focus on operation of the vehicle. A goal of the vehicular communication system is to support active safety vehicle features in avoiding and notifying of accidents and traffic congestions by taking advantage of the information exchange with the surrounding vehicle and road infrastructure stations. The features supported by V2V and V2I communication include vehicle diagnostics, vehicle assistance, intersection control, collision warning, and co-operative adaptive cruise control. These services usually require multiple radio links in order to monitor surroundings of the vehicle including other vehicles and the roadway infrastructure.

SUMMARY

A vehicle communication system includes a controller. The controller is programmed to, in response to a distress signal including emergency information and a relay count less than a predetermined number and to the vehicle being located a distance greater than a predetermined distance away from a transmission location and an origination location of the distress signal, cause the emergency information to be transmitted with an incremented relay count.

A vehicle includes an RF transceiver; and at least one controller. The at least one controller is programmed to receive a distress signal including emergency information and a relay count. The at least one controller is also programmed to cause the emergency information to be transmitted via the RF transceiver with an incremented relay count in response to expiration of a delay timer initiated upon receiving the distress signal and the relay count being less than a predetermined number.

A method of relaying an emergency message with a vehicle includes receiving an emergency message including emergency information and a relay count, and transmitting the emergency information with an incremented relay count in response to a location of the vehicle being more than a predetermined distance away from a transmission location of the emergency message.

DETAILED DESCRIPTION

Figure 1A:
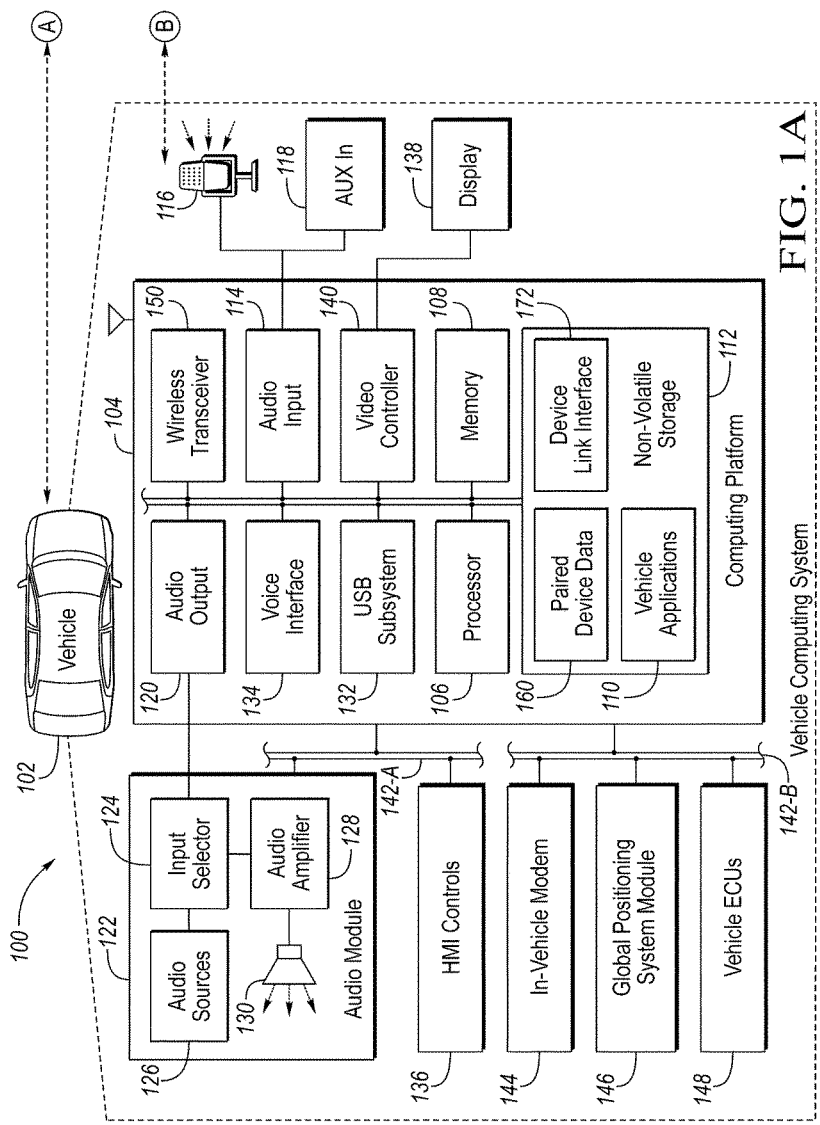
FIGS. 1A and 1B are an exemplary block topology of a vehicle infotainment system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

This disclosure, among other things, proposes communication systems and methods for vehicle to vehicle (V2V) and vehicle to infrastructure (V2I) communication. Emergency information associated with a vehicle may be transmitted from the vehicle in response to a request to transmit. The emergency information may include a frame of data. The frame of data may include vehicle identification data such as a Vehicle Identification Number (VIN) or other way to provide a make, model, and color of the vehicle, and a license plate of the vehicle. Other associated information that may be provided with the vehicle identification includes a current location of the vehicle, a current time, a location associated with an event and a time associated with the event, wherein the event may be associated with a condition of an occupant of the vehicle, a condition of the vehicle, or a condition of a road the vehicle is traveling on. The condition of an occupant of the vehicle may include a desire of the occupant such as hungry, thirsty, or looking for a bathroom, or may include a medical emergency. The condition of the vehicle may include a status based on internal vehicle diagnostics such as low fuel, low oil, over temperature, low on tire pressure, a current condition, or a past condition. The condition of the road may be assessed by a vehicle stability system of the vehicle to include road hazards such as a patch of ice or oil, a bump or pothole, and traffic. The vehicle stability system may provide vehicle speed, tire rotational speed for each tire, longitudinal acceleration, yaw and pitch. The request to transmit may be automatically generated by the system such as detection of a vehicle crash, vehicle diagnostics such as engine temperature, low oil pressure, low tire pressure, or may be based upon user activation such as depression of a button, a voice activated transmission.

The transmission may be a Radio Frequency (RF) transmission and may be received by a second vehicle. The second vehicle, upon reception of the information, may process the information including decoding the information and updating the information. Typically, a message sent by an originating vehicle is broadcast to all surrounding vehicles, and the second or surrounding vehicles may rebroadcast the information. Here, the message may be analyzed by a receiving vehicle to determine a distance between the originating vehicle and the receiving vehicle, a change in time from the transmission of the originating information to reception of the information by the receiving vehicle, and a relay count associated with retransmission or "hops" from the originating vehicle.

In one embodiment, to reduce RF transmissions and provide for information to be transmitted beyond the range of the RF transmitter of the originating vehicle, a delay may be added such that the originating message including the origination location and time and subsequent locations of relays, times of relays and a relay count may be transmitted after expiration of the delay such as underflow of a count down timer, overflow of a count up timer, or a match in the comparison of the timer with a predetermined value. The use of a delay allows the relay system to analyze the information and possibly subsequent retransmissions of updated information such that an area of coverage may be maximized and duplicated transmissions may be reduced. A supplement to this embodiment may be achieved by limiting the relay transmission of the information including updated information such that the relay transmission is only performed when the relay vehicle is at least a predetermined distance away from the preceding transmissions and the origination location.

Figure 1B:
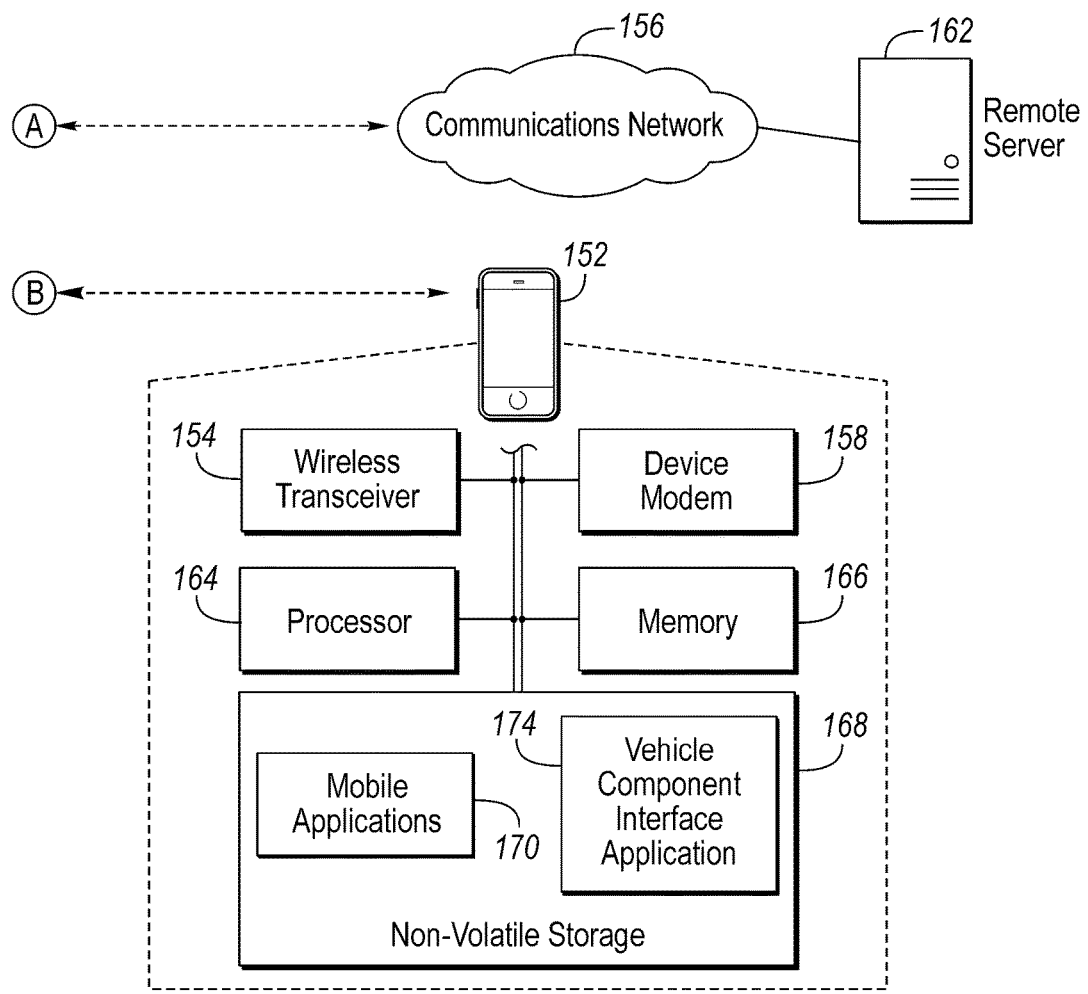

FIGS. 1A and 1B illustrate an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. The processor may also be multiple processors in multiple computing units which each perform a part of the overall driver alert. For example, one processor may perform audible alert functions, located in the audio module (122), while a different processor in the video controller (140) handles the visual alert, predicated from the same alert message. Computer-executable instructions may be compiled or interpreted from computer programs created using a variety of programming languages and/or technologies, including, without limitation and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142A, and the vehicle modem 144, GPS module 146, and vehicle ECUs 148 may communicate with the computing platform 104 over a second in-vehicle network 142B. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. The wireless modules may transmit data at a carrier frequency or a center frequency. The center frequency is an important aspect of a wireless system by impacting noise immunity and bandwidth. For example, typical remote keyless entry systems operate at 315 MHz in the United States, and 433 MHz in Europe, while WiFi and Bluetooth may operate at frequencies including frequencies over 2 GHz such as 2.4 GHz. Additionally or alternatively, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnect to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternatively, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interfaced 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif. The vehicle component interface application 174 may be once such application installed to the mobile device 152.

The vehicle component interface application 174 of the mobile device 152 may be configured to facilitate access to one or more vehicle 102 features made available for device configuration by the vehicle 102. In some cases, the available vehicle 102 features may be accessible by a single vehicle component interface application 174, in which case the vehicle component interface application 174 may be configured to be customizable or to maintain configurations supportive of the specific vehicle 102 brand/model and option packages. In an example, the vehicle component interface application 174 may be configured to receive, from the vehicle 102, a definition of the features that are available to be controlled, display a user interface descriptive of the available features, and provide user input from the user interface to the vehicle 102 to allow the user to control the indicated features. As exampled in detail below, an appropriate mobile device 152 to display the vehicle component interface application 174 may be identified, and a definition of the user interface to display may be provided to the identified vehicle component interface application 174 for display to the user.

Systems such as the system 100 and system 200 may require mobile device 152 pairing with the computing platform 104 and/or other setup operations. However, as explained in detail below, a system may be configured to allow vehicle occupants to seamlessly interact with user interface elements in their vehicle or with any other framework-enabled vehicle, without requiring the mobile device 152 or wearable device 202 to have been paired with or be in communication with the computing platform 104.

Figure 2:
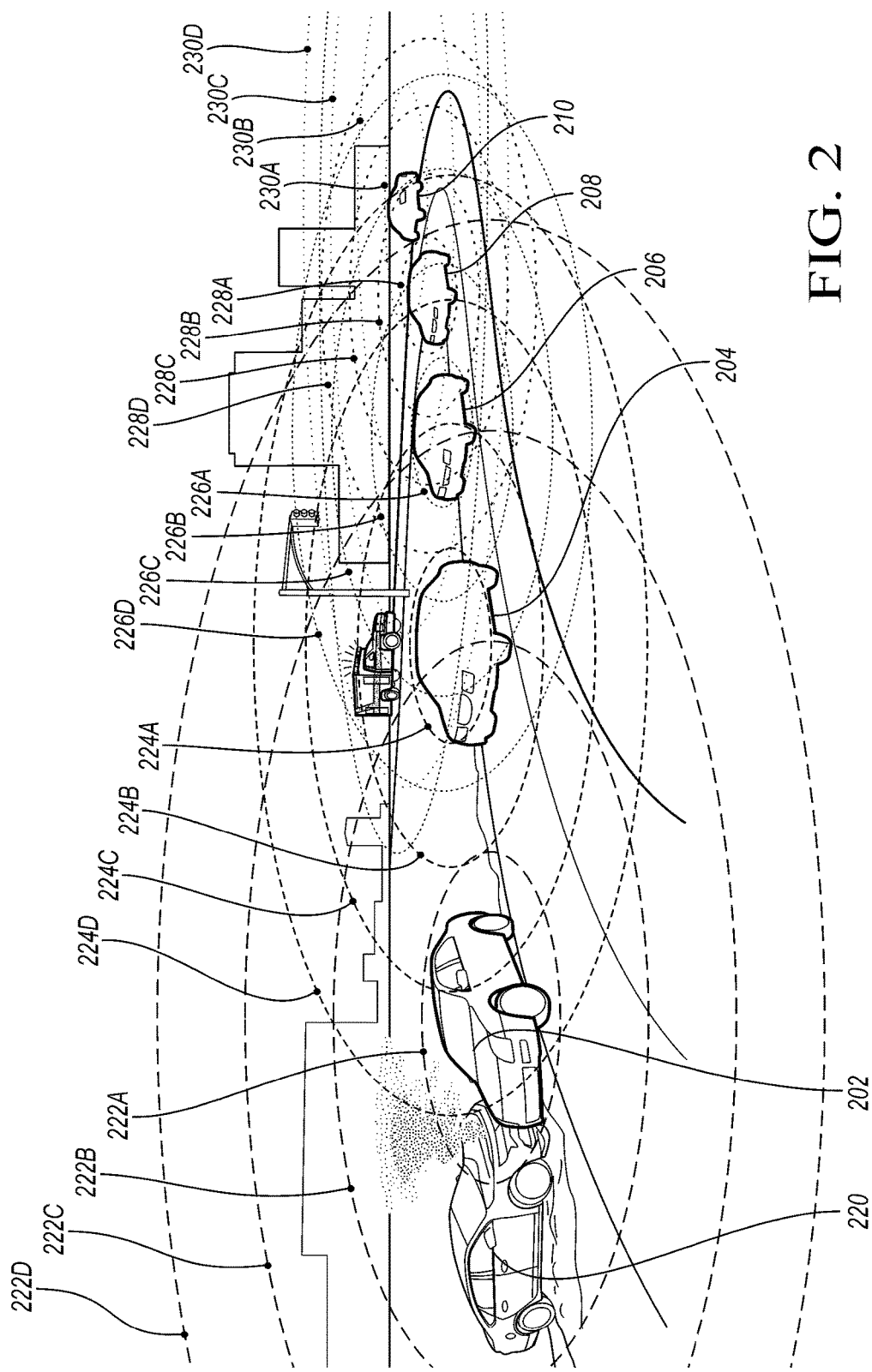
FIG. 2 is an exemplary illustration of a vehicle communication system relaying information between vehicles and a vehicular infrastructure.

FIG. 2 is an exemplary illustration of a vehicle communication system 200 for relaying information between vehicles and a vehicular infrastructure. The communication system 200 illustrates an originating vehicle 202 encountering an emergency. The emergency may include a vehicular based emergency, an occupant based emergency, or a road infrastructure based emergency. The vehicle based emergency may include a mechanical breakdown or malfunction, an electrical breakdown or malfunction, low air pressure in a tire of the vehicle, or a low vehicular fluid level. The occupant based emergency may include a medical emergency including circulation, respiration or nervous system impairment, or a personal emergency including need of a restaurant, rest room or rest stop. A road infrastructure based emergency may include a pothole, sinkhole, uneven pavement, frost heave, ice patch, oil spill or other roadway hazard.

In this illustration, the originating vehicle 202 is shown after an accident with another vehicle 220. Upon the occurrence of the accident, a driver or passenger of the vehicle 202 may need assistance and may not be a condition to physically make a call for assistance. Also, based on the location of the accident, the driver, passenger or a bystander in the proximate area may not be able to make a cellular call for multiple reasons including a lack of cellular service in that specific geographic location. For example, if a terrain is hilly, the range of a cellular telephone may be as little as 3 miles or 5 kilometers from a nearby cellular tower. In the event that a cellular phone call is not possible or desirable and if the vehicle 202 is equipped with a RF transmitter or an RF transceiver, the vehicle 202 may automatically transmit an originating message regarding a condition such as details of the accident. The transmission may be triggered automatically or manually. An event to provide automatic triggering may include an output of an accelerometer exceeding a threshold indicating that the vehicle had a sudden deceleration such as in an accident, deployment of an airbag, signal indicating that the vehicle has rolled over or other signals from systems configured to detect an accident or emergency. Also, the mechanism to provide the triggering may be manual such as a button in the vehicle or on a device coupled to the vehicle. The device coupled to the vehicle may be an RF based electronic system such as a keyfob, a cellular phone, or an electronic tablet. The button may be a single button or a plurality of buttons. The plurality of buttons may be configured such that each button has a specific function associated with its activation. For example, a system may include a medical button, a police button, and a fire/rescue button.

A message broadcasted by the system may include a field, the field of the message associated with a nature or classification of the emergency such as medical, police, fire/rescue, mechanical, or road hazard. The medical button may allow the message to be directed to first response, ambulance, hospital and medical personal. The field of the message associated with the police button may allow the message to be directed to local law enforcement. The field of the message associated with the fire/rescue button may allow the message to be directed to fire/rescue or towing services. The field of the message associated with the mechanical may allow the message to be directed to an OEM diagnostic service, an auto service station, or a towing service. And, the field of the message associated with the road hazard may allow the message to be directed to highway safety or the state department of transportation.

The originating message may include fields including a time of activation or time of triggering, a time of transmission of the originating message, a location associated with the vehicle 202 at a time of activation, a current location, speed, and heading associated with the vehicle 202 and a status associated with the vehicle 202. The status may include various fault codes from a variety of the vehicle ECUs 148. These fault codes could provide an indication of a level of damage the vehicle has. This data could then be used to help determine a severity of the accident. This information, in conjunction with the other data sent from the vehicle, could be used to determine if a local hospital would be equipped to treat the vehicle passengers or if the passengers would need to be air lifted to a hospital that was better suited to treating their condition. Also, the message may include a field for biometric data associated with the driver or an occupant. The message may also include relay fields including relay information including a time the message was relayed, a location of the relay vehicle, and a count associated with the number of relays or "hops". The relay fields may consist of a single relay field in which relay information regarding the last relay overwrites the field such that the most recent relay information is held in the field, or there may be a predetermined number of dedicated relay fields for each relay or "hop" of the information.

The originating message transmitted from the originating vehicle 202 may be transmitted via radio frequency (RF) signals. The energy of the RF signals is greater at a distance close to the originating vehicle 202 and the energy of the signal is reduced as the location from the originating vehicle 202 is increased. For example, an RF signal 222 will have different energies at different distances from the vehicle 202. At a circumference close to the vehicle 202, as illustrated as 222A, the energy is typically higher than the energy at a circumference further away from the vehicle 202, as illustrated as 222B; likewise, the energy at 222B is typically greater than the energy at 222C. Also, there is a limit to the effective range of the RF signals, as illustrated by 222D. When the RF signal is transmitted, it may be received by vehicles within the range of the RF signals 222D, such as vehicles 204, 206, and 208. Other vehicles on the roadway may be capable of receiving and transmitting RF signals. For example, vehicle 204 can transmit RF signal 224, vehicle 206 can transmit RF signal 226, vehicle 208 can transmit RF signal 228, and vehicle 230 can transmit RF signal 230. Each of the RF signals (224, 226, 228, and 230) will have different energies at different distances from the transmitting vehicle. For example, the energy of the RF signal 224 will typically decrease as the distance from the transmitting source becomes greater, so the energy at 224A is typically higher than the energy at 224B, likewise, the energy at 224C is typically greater than the energy at 222D. This applies to each of the RF signals 226, 228, and 230 (i.e. 226A-D, 228A-D, and 230A-D). Thus, it may be advantageous for a vehicle (such as vehicle 204 and 206) close to the originating vehicle 202 to not relay the message and a vehicle 208 within a predetermined distance from the originating vehicle 202 to relay the message.

Vehicles equipped with an RF receiver or an RF transceiver including a first vehicle 204, a second vehicle 206 and a relaying vehicle 208 may receive the RF signal. Many systems operate such that a vehicle receiving a message from another vehicle will not relay or re-broadcast that message. Here, it may be advantageous for the vehicles (204, 206, and 208) to relay the message especially if the vehicle 202 is at a location in which there is no or limited cellular coverage or the RF transmitter cannot reach the vehicular infrastructure. To relay the message, upon receiving the RF signal, all vehicles (204, 206, and 208) may re-broadcast the message. Also, the vehicles (204, 206, and 208) may re-broadcast the message after a delay period. The delay period may include a fixed delay, such as 2 seconds, or a variable delay. The variable delay may be a function of a distance from a vehicle infrastructure tower, a speed of the vehicle, a direction of the vehicle, an elevation of the vehicle, an expected elevation along a currently traveling route. The delay may also be associated with a location. For example, if a relay vehicle having a navigation system is traveling along a route and the navigation system anticipates that the vehicle will reach a point, the vehicle may store the message and delay the relay of the message until the vehicle reaches the point. The point may be associated with a location that is expected to have better transmission characteristics such as elevation, proximity to vehicular infrastructure having an RF receiver capability, greater vehicle density, and the vehicle being within a predetermined band of distances from the transmission point of the message.

Although vehicles 204, 206, and 208 may relay the information, if each vehicle (204, 206, and 208) that received the message relays the message, an overall increase in area the message covers may not justify an increase in overall system bandwidth used by the vehicles (204, 206, and 208). An example in which a relay bandwidth may be greatly increased with little added benefit is in congested areas such as metropolitan areas. As the coverage of area may not be significantly greater if each vehicle (204, 206, and 208) relays the message than if only a single vehicle 208 relays the message, inhibiting the relay of the message may be advantageous. Aspects to consider to inhibit the relay of the message include a distance from either/both the originating vehicle and a location the message was relayed, An example of a distance from either/both the originating vehicle and a location the message was relayed is if the relay vehicle is within a predetermined band of distances from a transmission point of the message, allow the message to be relayed and inhibit the relay of messages of vehicles outside the predetermined band of distances from a transmission point. Or if the single vehicle 208 is at a location greater than a predetermined distance from a transmission point of the message, allow the message to be relayed. Alternatively, the vehicle 208 may store the message until it travels to a point within a predetermined band of distances from the transmission point of the message, and if it has not received a relayed message associated with the original message, relay the message. For example, if vehicles (204, 206, and 208) receive the message, a vehicle 208 at a location being within a predetermined band of distances from the transmission point of the message, vehicle 208 would then relay the message, which is received by vehicle 210. Vehicle 210 may then relay the message due to vehicle 210 being within a predetermined band of distances from the transmission point of the message, vehicle 208, and within a predetermined band of distances from the other transmission points of the message, including the originating vehicle 202. The relayed message from vehicle 210 is then received by the emergency vehicle 212, the vehicle infrastructure 214, such as a hospital, fire station, or traffic light 216. The relayed message received by the emergency vehicle 212 may contain field information including the number of relays, in this example the first relay was by vehicle 208, the second relay was by vehicle 210 and the emergency vehicle 212 may be the third relay or vehicle 212 may be the destination and not relay the information. Further, upon reception by vehicle 212, a message may be broadcast to inhibit further transmission of this message.

If received by a traffic light, the traffic light may accommodate the emergency vehicle or the distressed vehicle if in motion to allow faster response. Also, the vehicle infrastructure may provide directions to the nearest facility for assistance based on data indicative that the vehicle is still in motion. The vehicle infrastructure may notify nearby agencies such as police, fire, and EMS.

The vehicle may gather data from a phone and other device including a infotainment system and forward that data to the infrastructure. The data sent to the infrastructure may include public data such as a license plate or Vehicle Identification Number (VIN) and secure data such as medical information, pulse rate, blood pressure, respiration rate, oxygen saturation, to the infrastructure (supporting autonomous driving) and public data to other vehicles.

Upon classification of the message, the infrastructure may forward the message to a controller, system or server to process the message thereby requesting emergency services including an ambulance, a tow truck, a police officer or a fire department. Also, the message may include both open and encrypted information, such that some information may be decrypted by the controller and confidentially transmitted to other agencies. For example, some biometric data may be collected by the vehicle 202 and encrypted by the vehicle 202 prior to transmission. The encrypted data may be received by other vehicles (204, 206, 208, 210, 212, and 220) and relayed by other vehicles (208, 210, and 212), however the vehicle receiving the data and relaying the data may not have the key to decrypt the data and therefore, obscure the meaning of the data while encrypted. This encryption mechanism would provide security of confidential information including medical information, insurance information, personal information, and financial information.

The use of dedicated relay fields allows a history or a path the relays took to reach a present location. Similar to the example in which the relaying was inhibited after reception by the emergency vehicle 212, the number of relays or "hops" may be limited such that only a certain number of relays is permitted after which the data is no longer relayed.

Figure 3:
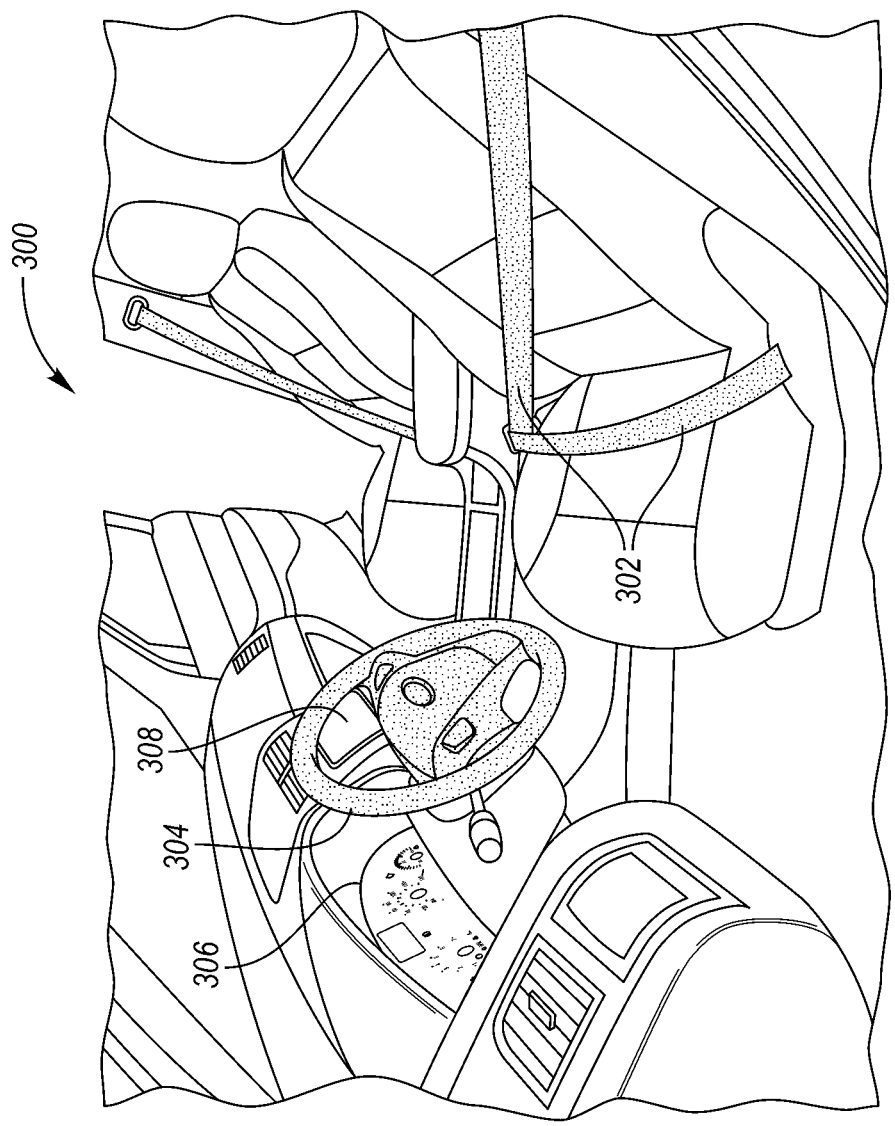
FIG. 3 is an exemplary illustration of a vehicle interior.

FIG. 3 is an exemplary illustration of a vehicle interior 300. The vehicle interior 300 includes a seat belt assembly 203, a steering wheel assembly 304, an instrument cluster 306 and an infotainment system 308. The seat belt assembly includes a seat belt and a sensor coupled to the seat belt. The sensor may be configured to measure biometric characteristics of a passenger secured by the seat beat. An example of biometric characteristics that may be detected by a seat belt include, heart rate, respiration rate, and movement indicative of being conscious. The steering wheel assembly may include a sensor configured to measure biometric characteristics of a passenger proximate to the steering wheel. The steering wheel may include a sensor on the steering to measure a heart rate and oxygen saturation based on measurements of a hand in contact with the steering wheel. The instrument cluster may include vision system or a camera in which the camera may detect biometric characteristics including movement of a person in the field of view indicative of consciousness, a respiration rate based on detected movement of the chest, activity of the driver based on eye motion. The infotainment system 308 may also include a vision system and/or an audible system to receive and transmit verbal commands and information to passengers in the vehicle interior 300. Similar to a camera in an instrument cluster, a camera in the infotainment system 308 may be configured to detect biometric characteristics including movement of a person in the field of view indicative of consciousness, a respiration rate based on detected movement of the chest, activity of the driver based on eye motion. The audible system in the infotainment system 308 may be configured to detect and convert audible sound waves to signals indicative of commands or sound waves indicative of biometric characteristics such as respiration rate and consciousness.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an RF transceiver; and
   at least one controller programmed to
      receive a distress signal including emergency information and a relay count, and
      in response to expiration of a delay timer initiated upon receiving the distress signal and the relay count being less than a predetermined number, cause the emergency information to be transmitted via the RF transceiver with an incremented relay count.

2. The vehicle of claim 1, wherein the delay timer has a duration greater than 2 seconds.

3. The vehicle of claim 1, wherein the at least one controller is further programmed to cause the emergency information to be transmitted in response to a location of the vehicle being within a band of distances away from a transmission location or an origination location of the distress signal.

4. The vehicle of claim 3, wherein the at least one controller is further programmed to, in response to the location of the vehicle being between the origination location and a transmission location, inhibit the transmitting of the emergency information.

5. The vehicle of claim 3, wherein the band of distances is greater than 100 meters and less than 10 kilometers.

6. The vehicle of claim 1, wherein the emergency information includes an identification of a distressed vehicle, and a location, a time, and a nature associated with the distress signal.

7. The vehicle of claim 6, wherein the identification of the distressed vehicle includes a Vehicle Identification Number (VIN) and a license plate number.

8. A method of relaying an emergency message with a vehicle comprising:
   receiving an emergency message including emergency information and a relay count; and
   transmitting the emergency information with an incremented relay count in response to a location of the vehicle being more than a predetermined distance away from a transmission location of the emergency message.

9. The method of claim 8, wherein the predetermined distance is greater than 100 meters.

10. The method of claim 8, wherein the transmitting is further in response to expiration of a delay timer having a duration greater than a predetermined time after receiving the emergency message.

11. The method of claim 10, wherein the duration is greater than 2 seconds.

12. The method of claim 8 further comprising inhibiting the transmitting in response to the location of the vehicle being between an origination location and a transmission location.

* * * * *